United States Patent
Huang et al.

(10) Patent No.: US 8,710,803 B2
(45) Date of Patent: Apr. 29, 2014

(54) CHARGING CURRENT CONTROL METHOD AND CHARGING SYSTEM

(75) Inventors: Jui-Chuan Huang, Taipei (TW); Ching-Feng Hsieh, Taipei (TW)

(73) Assignees: Askey Technology (Jiangsu) Ltd. (CN); Askey Computer Corp. (TW)

( * ) Notice: Subject to any disclaimer, the term of this patent is extended or adjusted under 35 U.S.C. 154(b) by 411 days.

(21) Appl. No.: 13/289,124

(22) Filed: Nov. 4, 2011

(65) Prior Publication Data

US 2013/0076312 A1    Mar. 28, 2013

(30) Foreign Application Priority Data

Sep. 23, 2011  (TW) .............................. 100134447 A

(51) Int. Cl.
*H02J 7/04*  (2006.01)
*H02J 7/16*  (2006.01)

(52) U.S. Cl.
USPC ........................................................ 320/145

(58) Field of Classification Search
USPC ........................................................ 320/145
See application file for complete search history.

(56) References Cited

U.S. PATENT DOCUMENTS

| | | | | | |
|---|---|---|---|---|---|
| 4,472,672 | A | * | 9/1984 | Pacholok | 320/145 |
| 5,710,506 | A | * | 1/1998 | Broell et al. | 320/145 |
| 5,831,420 | A | * | 11/1998 | Myers | 323/282 |
| 7,876,075 | B1 | * | 1/2011 | Chiu et al. | 323/229 |
| 2003/0155898 | A1 | * | 8/2003 | Olsen et al. | 323/283 |
| 2004/0239300 | A1 | * | 12/2004 | Sutardja et al. | 323/283 |
| 2008/0030183 | A1 | * | 2/2008 | Valentino | 323/285 |
| 2009/0085546 | A1 | * | 4/2009 | Phadke et al. | 323/284 |
| 2010/0327807 | A1 | * | 12/2010 | Kikinis et al. | 320/116 |
| 2011/0115459 | A1 | * | 5/2011 | Hsieh et al. | 323/285 |

* cited by examiner

*Primary Examiner* — Arun Williams
(74) *Attorney, Agent, or Firm* — Schmeiser, Olsen & Watts, LLP

(57) ABSTRACT

A charging method and a charging system are introduced for controlling a charging current by a PWM method. A charging IC is controlled to supply the charging current to a battery, and a control unit is used to generate a PWM signal with a duty cycle, and a filter unit is used to convert the PWM signal into a voltage signal to be supplied to the charging IC, and the control unit determines whether a current of a battery detected by the battery status detection unit reaches a regular current, so that a PWM signal with a duty cycle greater than the previous duty cycle by a default increased cycle is provided if the detected current has not reached the regular current. Thus, the feature of the PWM signal is used to set the charging current according to the capacity of the battery automatically.

12 Claims, 4 Drawing Sheets

CHARGING CURRENT CONTROL METHOD AND CHARGING SYSTEM

CROSS-REFERENCE TO RELATED APPLICATION

This non-provisional application claims priority under 35 U.S.C. §119(a) on Patent Application No(s). 100134447 filed in Taiwan, R.O.C. on Sep. 23, 2011, the entire contents of which are hereby incorporated by reference.

FIELD OF TECHNOLOGY

The present invention relates to a charging method and a charging system, in particular to the charging method and the charging system that controls a charging current by a PWM method.

BACKGROUND

In a battery charging process, a charging IC is generally provided for supplying a charging current to a battery to be charged, and a resistor is generally used for providing a set voltage to the charging IC to set a required charging current, so that when different charging currents have different requirements, it is necessary to use a plurality of resistors to provide different set voltages.

With reference to FIG. 1 for a circuit block diagram of a conventional charging device and a battery, the conventional charging device comprise a control unit 10, a set voltage providing circuit 20, and a charging IC 30. The set voltage providing circuit 20 is coupled between the control unit 10 and the charging IC 30. The set voltage providing circuit 20 is controlled by the control unit 10, and each switching transistor T1, T2 is controlled to be turned ON and OFF by the received control signal switching transistor T1, T2 to provide different combinations for resistors R1~R3, so as to provide different set voltages to a current setting terminal Iset of the charging IC 30, and the charging IC 30 can output a charging current Io from a current output terminal Out to a battery 40 according to the set voltage of the current setting terminal Iset.

In FIG. 1, a general charging system requires more resistors and switching transistors coupled to an integrated circuit to meet the different requirements of the charging current, thus incurring a higher cost and a larger area of the set voltage providing circuit 20. Therefore, another conventional programmable specific charging IC is introduced, wherein various different charging currents are provided directly according to a control signal of the control unit 10, such as an I2C high-performance charging device. However, the cost of such charging device is even higher.

SUMMARY

It is a primary objective of the present invention to provide a more flexible adjustment for a charging current and occupy a smaller circuit area.

To achieve the aforementioned and other objectives, the present invention provides a control method of a charging current used for controlling a charging IC to supply a corresponding charging current to a battery, and the method comprises the steps of: (A) providing a PWM signal with a duty cycle; (B) converting the PWM signal with the duty cycle into a corresponding voltage and supplying the voltage to the charging IC, so that the charging IC supplies the corresponding charging current to the battery according to the voltage; (C) obtaining a detected current and a regular current of the battery; (D) determining whether the detected current of the battery has reached the regular current; if yes, ending the adjustment of the charging current, or else entering into Step (E); and (E) returning to the Step (A), and providing a PWM signal with a duty cycle higher a default increased cycle in the Step (A).

To provide a charging protection for the battery, a preferred embodiment of the invention further comprises the steps of: (a) obtaining a detected temperature of the battery; (b) determining whether the detected temperature has reached the first threshold; if no, then returning to the Step (a), or else entering into Step (c); (c) reducing the current duty cycle of the PWM signal by a default decreased cycle; (d) obtaining the current detected temperature of the battery, and determining whether the detected temperature has reached the first threshold and is greater than a predetermined temperature of the first threshold; if no, then returning to the Step (a), or else entering into the Step (e); and (e) reducing the current duty cycle of the PWM signal by the default decreased cycle for every increase of the predetermined temperature compared with the first threshold, until the current duty cycle of the PWM signal drops to 0%.

In a preferred embodiment, a RC filter circuit is used for performing an integration of the PWM signal to produce the corresponding voltage in the Step (B).

In a preferred embodiment, a PWM signal with a duty cycle of 10% is provided in the Step (A); the default decreased cycle is set to 20% of the current duty cycle, and the predetermined temperature is set to 1° C., and the first threshold is set to 40° C., and the second threshold is set to 45° C.

In a preferred embodiment, the current duty cycle of the PWM signal drops to 0% when the detected temperature rises to the second threshold in Step (e).

The present invention further provides a charging system, for using a charging IC to supply a corresponding charging current to a battery, comprising: a battery status detection unit, coupled to the battery, for producing a detected current and a regular current of the battery;
a control unit, coupled to the battery status detection unit, for receiving the detected current and the regular current, generating a PWN signal with a duty cycle, and providing a PWM signal with a duty cycle greater than the previous duty cycle by a default increased cycle, when the control unit determines that the detected current of the battery has not reached the regular current; and a filter unit, coupled to the charging IC and the control unit, for receiving the PWM signal generated by the control unit, converting the PWM signal into a corresponding a voltage, and supplying the voltage to the charging IC.

In a preferred embodiment, the filter unit comprises a resistor, having a first terminal coupled to the control unit, and a second terminal coupled to the charging IC; and a capacitor, coupled between the second terminal and a ground.

Therefore, the present invention simply uses a RC filter circuit and generates a PWM signal to automatically set the charging current according to the capacity of different batteries, so as to monitor the charging temperature and protect the battery.

BRIEF DESCRIPTION

DETAILED DESCRIPTION

The objects, characteristics and effects of the present invention will become apparent with the detailed description of the preferred embodiments and the illustration of related drawings as follows.

In a preferred embodiment of the present invention, the charging system is adjusted and controlled, such that a charging IC coupled to the charging system can supply the corresponding charging current to a battery to be charged according to the adjustment and control.

Figure 1:
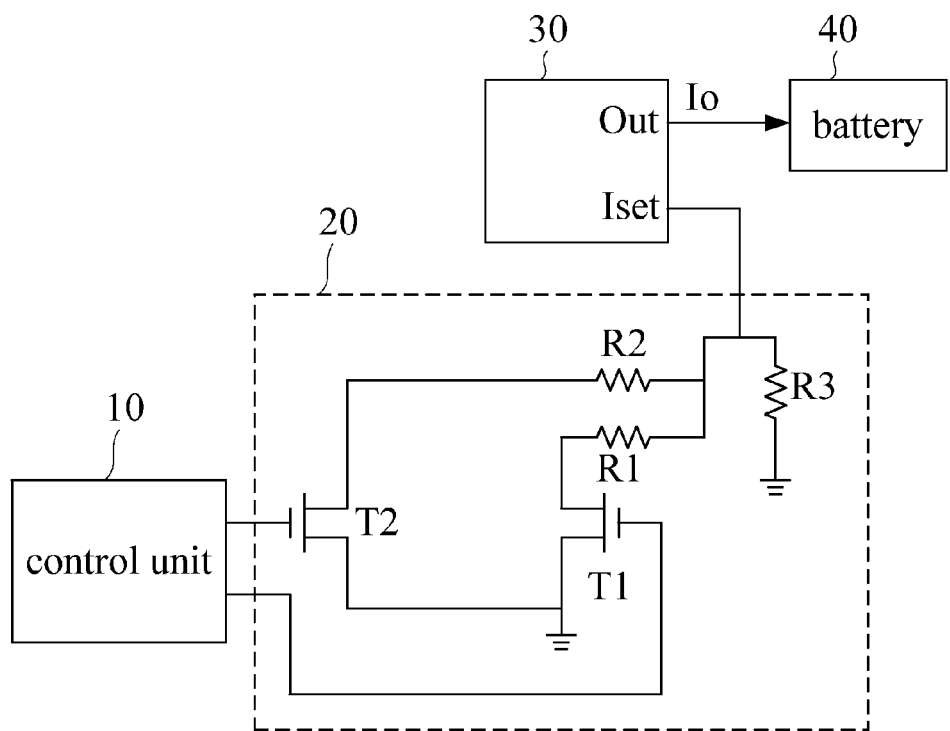
FIG. 1 is a circuit block diagram of a conventional charging system and a battery.
Figure 2:
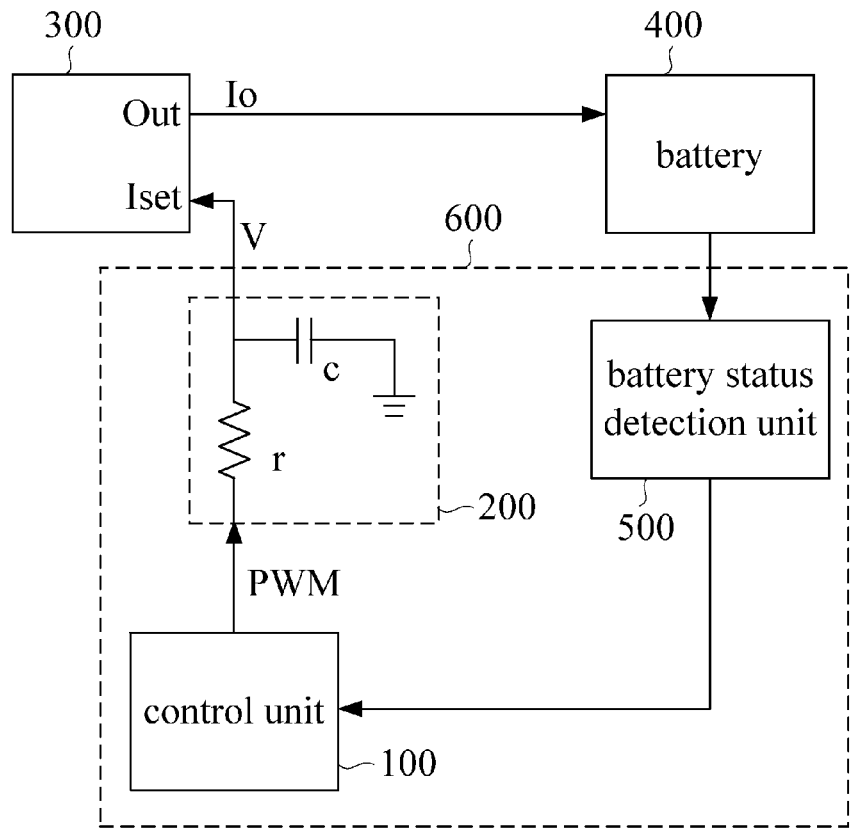
FIG. 2 is a circuit block diagram of a charging system, a charging IC and a battery in accordance with a preferred embodiment of the present invention.

With reference to FIG. 2 for a circuit block diagram of a charging system, a charging IC and a battery in accordance with a preferred embodiment of the present invention, the charging system 600 comprises a control unit 100, a filter unit 200, and a battery status detection unit 500.

The filter unit 200 is coupled to the charging IC 300 and the control unit 100 for converting a pulse width modulation (PWM) signal PWM generated by the control unit 100 into a corresponding voltage signal V, and providing the voltage signal V to a current setting terminal Iset of the charging IC 300, so that the charging IC 300 can output a specific charging current Io to the battery 400 according to the received voltage signal V. Wherein, the charging IC 300 can output different charging currents according to the voltage signal V, but this is a prior art and will not be described.

In a preferred embodiment, the filter unit 200 comprises: a resistor r and a capacitor c. The resistor r has a first terminal coupled to the control unit 100 for receiving the PWM signal PWM, and a second terminal coupled to the current setting terminal Iset of the charging IC 300 for transmitting the converted voltage signal V to the charging IC 300. The capacitor c is coupled between the second terminal of the resistor r and a ground. With the installation of the resistor r and the capacitor c, an integration of the PWM signal PWM can be performed to produce a voltage signal V.

The battery status detection unit 500 is coupled to the battery 400 and the control unit 100 for obtaining a detected current and a regular current of the battery 400. The battery status detection unit 500 is a battery gauge generally bundled with a battery to provide information on the status of the battery, and the preferred embodiment of the present invention uses such battery information to adjust and control a charging current.

The control unit 100 is coupled to the filter unit 200 and the battery status detection unit 500 for receiving the detected current and the regular current. When a battery starts charging, the control unit 100 generates a PWM signal PWM with a duty cycle, and provides the PWM signal PWM to the filter unit 200, and the control unit 100 bases on the information provided by the battery status detection unit 500 to determine whether the detected current of the battery 400 has reached the regular current such as 4000 mA of the battery 400. If the detected current of the battery 400 has not reached the regular current, the control unit 100 provides a PWM signal PWM with a duty cycle greater than the previous duty cycle by a default increased cycle. In a preferred embodiment of the present invention, a lower PWM signal PWM is provides at the beginning, and a lower charging current is used for charging the battery 400, and then the feature of the PWM signal PWM gradually increases the percentage of the duty cycle, so that the converted voltage signal V rises gradually to increase the charging current, and finally the charging current rise to an appropriate charging current (in other words, the detected current of the battery to be charged has reached the regular current).

Further, the control unit 100 is used for obtaining a detected temperature of the battery 400 from the battery status detection unit 500 and determining whether the detected temperature has reached a first threshold. If the detected temperature has reaches the first threshold, the current duty cycle of the PWM signal PWM is reduced by a default decreased cycle. In addition, the control unit 100 is further used for reducing the current duty cycle of the PWM signal PWM by the default decreased cycle for every increase of a predetermined temperature, when the detected temperature is greater than the first threshold compared with the first threshold. Wherein, if the detected temperature rises to the second threshold, the current duty cycle of the PWM signal PWM drops to 0%.

For example, a PWM signal PWM with a duty cycle of 10% is provided at the beginning. Before the charging current has reached the regular current of the battery 400 to be charged, the battery temperature generally will not be abnormal, so that when the detected temperature has reached the first threshold such as 40° C., the charging current generally has reached the regular current. Now, the detected temperature has reached 40° C., so that the duty cycle of the PWM signal PWM will be decreased to 20% of the current duty cycle. If the detected temperature still rises, then the duty cycle of the PWM signal PWM will be decreased continuously. Compared with the first threshold (40° C.), for an increase of the temperature by 1° C., the PWM signal PWM will drop 20%. When the temperature reaches 45° C., the PWM signal PWM will drop to 0%.

Figure 3:
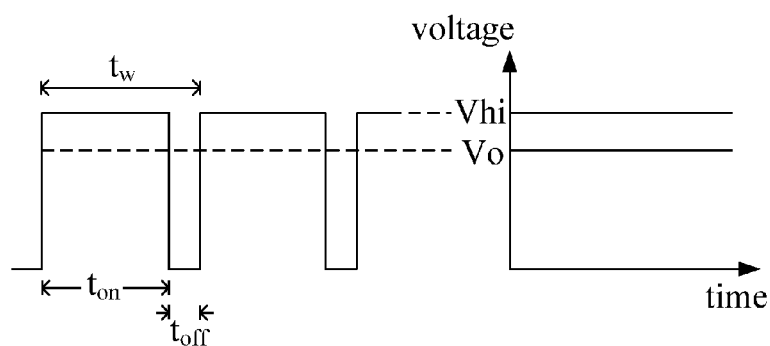
FIG. 3 is a schematic view of converting a PWM signal with a duty cycle into a voltage in accordance with a preferred embodiment of the present invention.

With reference to FIG. 3 for a schematic view of converting a PWM signal with a duty cycle into a voltage in accordance with a preferred embodiment of the present invention, tw represents a complete pulse cycle, ton represents the time of a logical high (Hi), toff represents the time of a logical low (low), and Vhi is the potential of a logical high (Hi). Therefore, a square wave with a fixed cycle percentage converted by the filter unit 200 can be used for obtaining a constant output voltage Vo. If it is necessary to change the output voltage, the ratio of ton/toff is changed. The duty cycle as shown in FIG. 3 is 80% in this embodiment.

Figure 4:
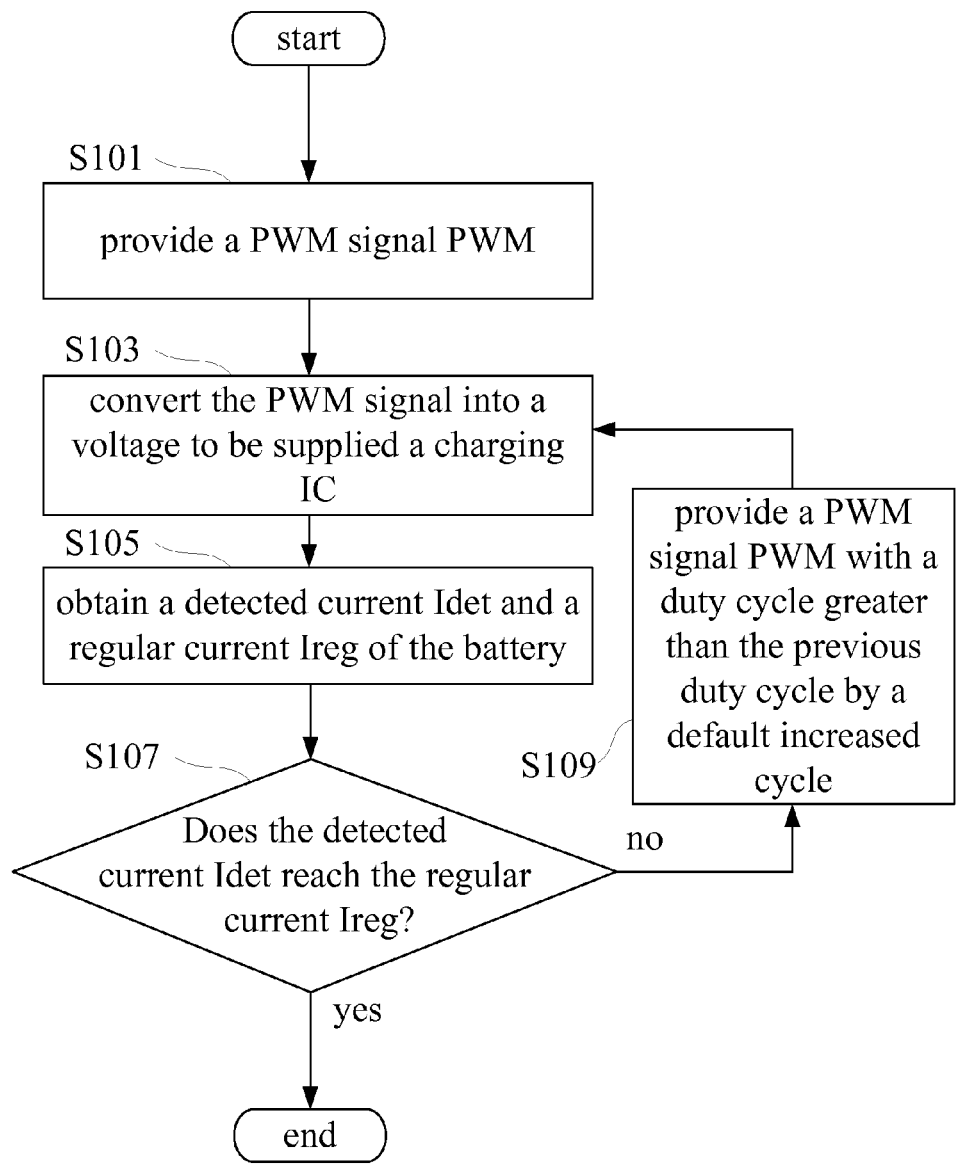
FIG. 4 is a flow chart of a charging current control method in accordance with a preferred embodiment of the present invention.

With reference to FIG. 4 for a flow chart of a charging current control method in accordance with a preferred embodiment of the present invention, the method comprises the following step 0073.

Step (S101): Provide a PWM signal PWM with a duty cycle.

Step (S103): Convert the PWM signal with the duty cycle into a corresponding voltage and supply the voltage to the charging IC.

Step (S105): Obtain a detected current Idet and a regular current Ireg of the battery.

Step (S107): Determine whether the detected current Idet of the battery has reached the regular current Ireg; if yes, end the adjustment of the charging current, or else enter into Step (S109).

Step (S109): Provide a PWM signal PWM with a duty cycle greater than the previous duty cycle by a default increased cycle, and return to Step (S103).

Figure 5:
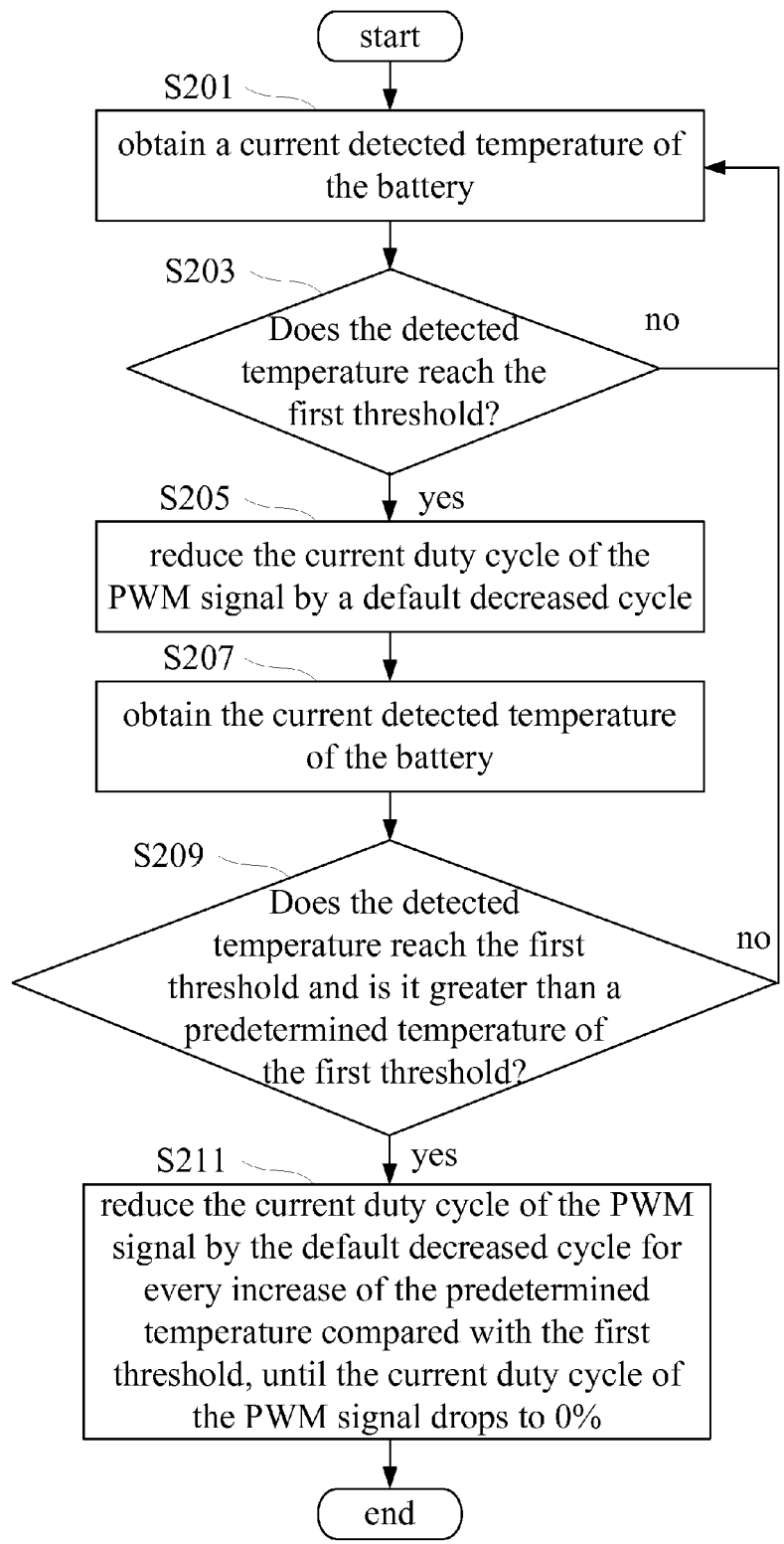
FIG. 5 is a flow chart of a charging current control method in accordance with another preferred embodiment of the present invention.

With reference to FIG. 5 for a flow chart of a charging current control method in accordance with another preferred embodiment of the present invention, the method adds a procedure of monitoring and controlling the battery temperature and this step can be applied in any step of the method as shown in FIG. 4. The procedure comprises the following steps. Step (S201): obtain a current detected temperature of the battery.

Step (S203): Determine whether the detected temperature has reached the first threshold; if no, then return to Step (S201), or else enter into Step (S205).

Step (S205): Reduce the current duty cycle of the PWM signal by a default decreased cycle Step (S207): Obtain the current detected temperature of the battery.

Step (S209): Determine whether the detected temperature has reached the first threshold and is greater than a predetermined temperature of the first threshold; if no, return to Step (S201), or else enter into Step (S211).

Step (S211): Reduce the current duty cycle of the PWM signal by the default decreased cycle for every increase of the predetermined temperature compared with the first threshold, until the current duty cycle of the PWM signal drops to 0%.

Wherein, if the detected temperature rises to the second threshold in Step (S211), the current duty cycle of the PWM signal will drop to 0%.

In summation of the description above, the modulation feature of the PWM signal can be used together with the RC filter circuit to produce different required voltage level, so as to control the charging IC to set an appropriate charging current according to the capacity of different batteries. Unlike the prior art, the present invention does not require a larger circuit, occupy a larger area, or incur a higher-priced programmable specific charging IC. The present invention can further monitor the charging temperature to protect the battery.

While the invention has been described by means of specific embodiments, numerous modifications and variations could be made thereto by those skilled in the art without departing from the scope and spirit of the invention set forth in the claims.

What is claimed is:

1. A charging current control method, for controlling a charging IC to supply a corresponding charging current to a battery, comprising the steps of:
    (A) providing a PWM signal with a duty cycle;
    (B) converting the PWM signal with the duty cycle into a corresponding voltage and supplying the voltage to the charging IC, so that the charging IC supplies the corresponding charging current to the battery according to the voltage;
    (C) obtaining a detected current and a regular current of the battery;
    (D) determining whether the detected current of the battery has reached the regular current;
    if yes, ending the adjustment of the charging current, or else entering into Step (E); and
    (E) returning to the Step (A), and providing a PWM signal with a duty cycle higher a default increased cycle in the Step (A).

2. The control method of claim 1, further comprising the steps of:
    (a) obtaining a detected temperature of the battery;
    (b) determining whether the detected temperature has reached the first threshold; if no, then returning to the Step (a), or else entering into Step (c);
    (c) reducing the current duty cycle of the PWM signal by a default decreased cycle;
    (d) obtaining the current detected temperature of the battery, and determining whether the detected temperature has reached the first threshold and is greater than a predetermined temperature of the first threshold; if no, then returning to the Step (a), or else entering into the Step (e); and
    (e) reducing the current duty cycle of the PWM signal by the default decreased cycle for every increase of the predetermined temperature compared with the first threshold, until the current duty cycle of the PWM signal drops to 0%.

3. The control method of claim 1, wherein the PWM signal with the duty cycle is processed by an integration to produce the corresponding voltage by using a RC filter circuit in the Step (B).

4. The control method of claim 1, further providing a PWM signal with a duty cycle of 10% in the Step (A).

5. The control method of claim 2, wherein the default decreased cycle is set to 20% of the current duty cycle, and the predetermined temperature is set to 1° C.

6. The control method of claim 2, wherein the current duty cycle of the PWM signal drops to 0% when the detected temperature rises to the second threshold in Step (e).

7. The control method of claim 6, wherein the first threshold is set to 40° C., and the second threshold is set to 45° C.

8. A charging system, for using a charging IC to supply a corresponding charging current to a battery, comprising:
    a battery status detection unit, coupled to the battery, for producing a detected current and a regular current of the battery;
    a control unit, coupled to the battery status detection unit, for receiving the detected current and the regular current, generating a PWN signal with a duty cycle, and providing a PWM signal with a duty cycle greater than the previous duty cycle by a default increased cycle, when the control unit determines that the detected current of the battery has not reached the regular current; and
    a filter unit, coupled to the charging IC and the control unit, for receiving the PWM signal generated by the control unit, converting the PWM signal into a corresponding a voltage, and supplying the voltage to the charging IC.

9. The charging system of claim 8, wherein the filter unit comprises:
    a resistor, having a first terminal coupled to the control unit, and a second terminal coupled to the charging IC; and
    a capacitor, coupled between the second terminal and a ground.

10. The charging system of claim 8, wherein the battery status detection unit is provided for obtaining a detected temperature of the battery; the control unit determines whether the detected temperature has reached a first threshold, and reduces the current duty cycle of the PWM signal by a default decreased cycle when the detected temperature has reached the first threshold.

11. The charging system of claim 10, wherein the control unit is provided for reducing the current duty cycle of the PWM signal by the default decreased cycle for every increase of a predetermined temperature, when the detected temperature is determined to be greater than the first threshold.

12. The charging system of claim 11, wherein the control unit is provided for reducing the current duty cycle of the PWM signal to 0%, when the detected temperature rises to the second threshold.

* * * * *